United States Patent [19]

Hirakouchi et al.

[11] Patent Number: 5,346,543
[45] Date of Patent: Sep. 13, 1994

[54] DEINKING AGENT FOR RECLAIMING WASTE PAPER

[75] Inventors: Yoshie Hirakouchi, Koga; Ikuo Adachi, Yotsukaidou; Yoshiaki Nagai, Tokyo, all of Japan

[73] Assignee: Lion Corporation, Tokyo, Japan

[21] Appl. No.: 135,909

[22] Filed: Oct. 13, 1993

[30] Foreign Application Priority Data

Oct. 15, 1992 [JP] Japan .................................. 4-277531

[51] Int. Cl.$^5$ .............................................. C08L 91/00
[52] U.S. Cl. ...................................... 106/243; 252/117
[58] Field of Search .......................... 106/243; 252/117

[56] References Cited

U.S. PATENT DOCUMENTS 3,928,276 12/1975 Linden et al. ...................... 106/243
4,710,267 12/1987 Elsby et al. ............................ 162/5

FOREIGN PATENT DOCUMENTS 3-69687  3/1991  Japan .
4-163384 6/1992  Japan .

OTHER PUBLICATIONS

English language abstract of Japanese Hei 3-69687. (Mar. 1991).
English language abstract of Japanese Hei 4-163384. (Jun. 1992).

Primary Examiner—David Brunsman
Attorney, Agent, or Firm—Willian Brinks Hofer Gilson & Lione

[57] ABSTRACT

A deinking agent comprises a compound of the following formula (I);

$$N(R^1)(R^1) R^2 \qquad (I)$$

wherein $R^1$ is $-C(O)R^4$ or $-(C_2H_4O)C(O)R^4$; $R^2$ is $-(C_2H_4O)-(AO)_m$ or $-(AO)_m$; $R^3$ is $-C(O)R^4$ or $-(C_2H_4O)C(O)R^4$; $R^4$ is $C_{9-23}$ alkyl or $C_{9-23}$ alkenyl; m is a integer from 40 to 100 and A is $C_{2-4}$ alkylene, and a quaternary ammonium compound thereof in a molar ratio of 9/1 to 1/9. The deinking agent for reclaiming printed waste paper has abilities to efficiently release the ink from the waste paper in the disintegration process and to collect the ink and produce suitable foam in the flotation process, which provides high quality reclaimed pulp having high whiteness and a low content of remaining ink.

20 Claims, No Drawings

DEINKING AGENT FOR RECLAIMING WASTE PAPER

BACKGROUND OF THE INVENTION

The present invention relates to a deinking agent for reclaiming waste paper used in preparing reclaimed pulp from printed waste paper such as newspaper, magazine and so on, and more specifically to a deinking agent for reclaiming waste paper which is suitable for using in a flotation process.

It has been conducted for a long time that paper pulp is reclaimed from printed waste paper such as newspaper, magazine to reuse the resulting reclaimed pulp as a feedstock for papermaking. In particular, recently the recycle of waste paper has been increasingly important and the resulting reclaimed pulp has widely been used in various fields from the viewpoint of effective use of various resources and of the environmental protection.

When printed waste paper is intended to be reused, the waste paper is reclaimed as waste paper pulp by using a disintegrator such as a pulper with an alkaline agent such as sodium hydroxide, sodium carbonate or sodium silicate, a bleaching agent such as hydrogen peroxide or sodium hypochlorite, a chelating agent such as EDTA and DTPA, and a deinking agent, for example, anionic surfactant such as fatty acid, alkylbenzenesulfonates, α-olefinsulfonates, higher alcohol sulfate salts and dialkylsulfosuccinate; nonionic surfactants such as alkylene oxide adducts of higher alcohol, alkylphenols and fatty acids; and a mixture thereof.

In order to enhance the deinking efficiency, deinking devices such as kneader, refiner and disperser have been improved to make the ink removed from the waste paper into fine particles in deinking process.

However the above-mentioned deinking agents are insufficient to collect the ink removed from the waste paper in the flotation process and thus they cannot provide high quality reclaimed pulp having high whiteness and a low content of remaining ink.

Japanese Patent unexamined publication (hereinafter referred to as J. P. Kokai) No. 51-53005 discloses a deinking agent comprising a quaternary ammonium salt cationic surfactant and J. P. Kokai No. 64-6190 also discloses a deinking agent comprising a combination of nonionic surfactant and a quaternary ammonium salt cationic surfactant wherein part of alkyl groups are replaced by hydroxyl. However the deinking agents do not have sufficient ability to deink from the waste paper, that is, the resultant reclaimed pulp has high content of remaining ink and low whiteness due to resticking part of the removed ink to the pulp.

SUMMARY OF THE INVENTION

Accordingly, an object of the present invention is to provide a deinking agent for reclaiming printed waste paper which provides high quality reclaimed pulp having high whiteness and a low content of remaining ink.

Another object of the present invention is to provide a deinking agent for reclaiming printed waste paper which can efficiently release ink from the waste paper in the disintegration process and which have excellent ability of collecting the ink and suitably foaming in the flotation process.

These and other objects of the present invention will be apparent from the following description and Examples.

The inventors of this invention have performed various studies to develop a deinking agent having preferred properties such as those discussed above and they have found out that the product obtained by quaternizing with quaternizing agent, a reaction product of an amine having at least two active hydrogens in its molecule, a fatty acid and/or a fatty acid alkyl ester and alkylene oxides has an excellent deinking ability to efficiently resolve the above problems. The present invention is accomplished on the basis of the finding.

Accordingly, the present invention provides a deinking agent for reclaiming waste paper comprising a mixture obtained by treating, with a quaternizing agent, a product prepared by addition of alkylene oxide to a reaction product of an amine having at least two active hydrogen atoms in its molecule with a fatty acid and/or a fatty acid alkylene esters, an amount of the quaternizing agent being 0.1 to 0.9 mole per mole of the amine.

DESCRIPTION OF THE PREFERRED EMBODIMENTS

In a preferred embodiment, the present invention provides a deinking agent comprising a compound of the following formula (I) and a quaternary ammonium compound thereof in a molar ratio of from 9/1 to 1/9, preferably 4/1 to 2/3:

$$N(R^1)(R^2) R^3 \qquad (I)$$

wherein $R^1$ is $—C(O)R^4$ or $—(C_2H_4O)C(O)R^4$; $R^2$ is $—(C_2H_4O)—(AO)_mH$ or $—(AO)_mH$; $R^3$ is $—C(O)R^4$ or $—(C_2H_4O)C(O)R^4$; $R^4$ is $C_{9-23}$ alkyl or $C_{9-23}$ alkenyl; m is an integer from 40 to 100, preferably from 40 to 75 and A is $C_{2-4}$ alkylene. The quaternary ammonium compound of the compound having formula (I) possesses $C_{1-18}$ alkyl groups or an aryl groups, preferably methyl, ethyl or benzyl at the position of coordinate bond on the nitrogen atom.

Examples of the fatty acids for producing the deinking agent of the present invention include fatty acids, semi-hardened fatty acid and hardened fatty acid derived from animal oiles such as lard and tallow and vegetable oils, such as, olive oil, palm oil, soybean oil, rapeseed oil, linseed oil and coconut oil, fish oils and the like, and synthesized fatty acid having 10 to 24 of carbon atoms. Preferred are saturated or unsaturated straight chain fatty acid having 12 to 18 of carbon atoms. These fatty acids may be used alone or as a mixture of two or more of them. Examples of the fatty acid alkyl esters usable in the invention include $C_{1-10}$ alkyl esters of the above fatty acid, preferably $C_{1-3}$ alkyl esters such as methyl ester.

Examples of the amines having at least two active hydrogens for producing the deinking agent of the present invention include mono-, di- and trialkanol amines which have 2 to 12 of carbon atoms. Among these, preferred are monoethanol amine, diethanol amine and triethanol amine, more preferably triethanol amine.

Examples of the alkylene oxides for producing the deinking agent of the present invention include ethyleneoxide, propyleneoxide, butyleneoxide and the like. It may be used singly or in combination, when two or more alkylene oxides are used the alkylene oxides may be added to the reaction product by using a mixture of two or more alkylene oxides (random addition) or successive adding of the alkylene oxides (block addition). In particular, the random addition or the block addition using a ethyleneoxide and alkenyleneoxide other than the ethyleneoxide are preferably. A ratio of the ethyleneoxide is preferably not less than 50 molar percent of total alkylene oxides.

At the quaternazing agent for producing the deinking agent of the present invention, alkylhalides having from 1 to 18 of carbon atoms, arylhalides and alkylsulfates having from 1 to 18 of carbon atoms are preferable. Specific examples of the quaterazing agent include methyl chloride, benzyl chrolide, dimethyl sulfate and diethyl sulfate.

In accordance with the present invention, the deinking agent can be produced by reacting the above mentioned fatty acid and/or fatty acid alkyl ester, the amine, the alkylene oxide and the quaternizing agent in an optional ratio. However it is desirable to use 1.0 to 3.0 mole, preferably 1.5 to 2.5 mole of the fatty acid and/or the fatty acid alkyl ester; 40 to 100 mole, preferably 40 to 75 mole of the alkylene oxide; 0.1 to 0.9 mole, preferably 0.2 to 0.6 mole of the quarterizing agent relative to 1 mole of the amine. When the amount of the fatty acid and/or fatty acid alkyl ester, the amine, the alkylene oxide and the quaternizing agent is adjusted within the mole range mentioned above, the removal of the ink from the waste paper is increased and the ability of collecting the ink in the flotation process is enhanced. The reclaimed pulp having high whiteness cannot be obtained in less than 0.1 mole of the quaterizing agent per mole of the amine since the resulting deinking agent has weak properties of collecting ink and the fine ink particles cannot be completely collected. The reclaimed pulp having high whiteness cannot be also obtained in 1.0 mole or more of the quaterizing agent per mole of the amine since the resulting deinking agent has strong properties of removing the ink and the reclaimed pulp is recontaminated by the removed ink.

The reaction of the fatty acid or the fatty acid alkyl ester and the amine is not limited to specific one, but the reaction can be carried out by the conventional amide forming reaction of the fatty acid and the amine, esterification reaction of an alcoholic hydroxy group in the amine and the fatty acid, or ester exchange reaction of the alcoholic hydroxy group in the amine and the fatty acid alkyl ester. In the preferred embodiment, the fatty acid and triethanol amine in the mole ratio as mentioned hereinbefore may be esterified in the presence of or absence of acidic or alkaline catalyst at a temperature of 100° to 250° C. under a reduced pressure.

The alkylene oxide may be additionally reacted with the reaction product of the fatty acid or the fatty acid alkylester and the amine under the conventional condition in which addition reaction of the alkylene oxide to a compound having an active hydrogen is conducted. The addition reaction of the alkylene oxide to the above mentioned esterified reaction products can be conducted in the presence of a catalytic amount of alkaline material at a temperature of about 100° to about 200° C. under 1 to 3 kg/cm² of the pressure for several hours.

Quaterizing reaction of the resulting alkylene oxide adducts may be conducted under the conventional condition in which a tertiary amine is quaternized. It can be quaterized by adding diethylsulfate to the alkylene oxide adducts and then reacting them at a temperature ranging from 40° to 140° C. for several hours.

The deinking agent of the present invention has excellent properties and also has the properties when it is combined with one or more known deinking agents such as fatty acids, salts of higher alcohol sulfate, alkylbenzen sulfonates, alkylene oxide adducts, higher alcohol, alkylphenol and fatty acid. The deinking agent of the invention may be added to either the disintergration process or aging process or may be added to these two processes. The agent is the most effective in adding to the disitergration process. It is preferably to add the agent to the waste paper in a range of 0.2 to 1.0 percent by weight (hereinafter abbreviated to %) relative to the weight of the waste paper.

The deinking agent of the present invention has excellent properties of removing the ink fixed on pulp fiber of the printed waste paper such as newspaper and magazine and also excellent properties of collecting the ink in the flotation process. A use of the deinking agent therefore provides a high quality reclaimed pulp having high whiteness and a low content of remaining ink and enables to stably conduct a deinking process without any foaming problems.

The present invention will hereinafter be described in more detail with reference to the following non-limitative working examples and preparation examples.

EXAMPLE 1

Preparation of the deinking agent 2 moles of tallow fatty acid and 1 mole of triethanol amine were added to an autoclave and then the temperature was increased with stirring to dehydrate at a temperature of 160° C. under a reduced pressure. 0.3 % of an alkaline catalyst (relative to the weight of the resulting alkylene oxide adduct) was added thereto and then 20 moles of ethylene oxide (EO) and 30 moles of propylene oxide (PO) were mixed therewith to conduct an addition reaction of alkylene oxide at a temperature of 150 ° C. under the pressure of 3 atoms. 0.5 mole of diethylsulfate was added to the reactant and uniformly stirred at 70° C. for 1 hour to prepare the deinking agent shown in table 1.

A test of deinking ability

Printed waste paper as a starting material (offset-printed waste paper/typographically-printed waste paper/leaflet=4/3/3 (weight ratio)) was cut into pieces of 3×3 cm, charged into a pulp disintegrator. There were added, on the basis of the weight of the waste paper, 1.0 % of sodium hydroxide, 3.5 % of sodium silicate (No.3), 1.0 % (effective amount) of hydrogen peroxide and 0.35 % of the deinking agent listed in Table 1 to the disintegrator followed by addition of hot water in an amount sufficient to adjust the concentration of the pulp to 5 % and disintegration at 35° C. for 7 minutes. The resulting pulp slurry was soaked at 65° C. for 60 minutes, added hot water in an amount sufficient to adjust the concentration of the pulp slurry to 1% followed by flotation at 30° C. for 7 minutes. After the flotation, the pulp slurry was concentrated to 10 % and then diluted to 1% with water followed by preparation of the pulp sheet from the pulp slurry using a TAPPI sheet machine.

The whiteness of the resulting pulp sheet was determined by color measurement color difference meter and the amount of the remaining ink was determined in terms of rate of area carrying the remaining ink measured by an image analyzer. The result of the test was shown in Table 2.

EXAMPLES 2

The deinking agent was prepared by the same procedure used in Example 1 except that ingredients listed in table 1 were used. The resulting deinking agent was tested in the same way as Example 1. The result of the test is shown in Table 2.

COMPARATIVE EXAMPLE 1

Tallow trimethyl ammonium chloride which is a conventional deinking agent was tested in the same way as in Example 1. The result of the test is shown in Table 2.

COMPARATIVE EXAMPLE 2

A mixture of tallow fatty acid and $C_{12}H_{26}(C_2H_4O)_3$-$SO_3Na$ in a ratio of 0.5/0.08 (%) was used and calcium chloride was added in an amount of sufficient to adjust a content of calcium to 50 ppm in the flotation process. The deinking agent was tested in the same way as Example 1. The result of the test is shown in Table 2.

COMPARATIVE EXAMPLE 3

A reactant product of 1.0 mole of trierhanol amine and 2 moles of methyl ester of palm oil fatty acid was subjected to an addition reaction with 70 moles of EO followed by quaterizing the resulting product with 1.0 mole of dimethyl sulfate to obtain the deinking agent. The deinking agent was tested in the same way as Example 1. The result of the test is shown in Table 2.

COMPARATIVE EXAMPLE 4

A reactant product of 1.0 mole of trierhanol amine and 2 moles of tallow fatty acid was subjected to an addition reaction with 20 moles of EO and 50 moles of PO to obtain the deinking agent. The deinking agent was tested in the same way as Example 1. The result of the test is shown in Table 2.

TABLE 1

| | Composition of the deinking agents | | | | |
|---|---|---|---|---|---|
| Example No. | Fatty acid or Fatty acid of alkyl ester | Amine | Mole ratio *1) | Alkylene Oxide mole *2) | Quaterizing agent mole ratio *3) |
| 1 | Tallow fatty acid | Triethanol amine | 2.0/1.0 | EO/PO 20/30 (random) | Diethyl sulfate 0.5/1.0 |
| 2 | Methyl ester of tallow fatty acid | Diethanol amine | 2.0/1.0 | EO/BO 60/15 (block) | Methyl chloride 0.3/1.0 |

*1) A reaction ratio of the fatty acid and the amine
*2) EO is ethylene oxide, PO is propylene oxide and BO is butylene oxide.
*3) A reaction ratio of the quaterizing agent and the amine

TABLE 2

| | The result of the test | |
|---|---|---|
| | Whiteness(%) | Remaining ink (number/1 field) |
| Example | | |
| No. 1 | 57.1 | 0.178 |
| No. 2 | 57.4 | 0.157 |
| Comparative example | | |
| No. 1 | 50.4 | 1.139 |
| No. 2 | 51.9 | 1.041 |
| No. 3 | 52.5 | 0.985 |
| No. 4 | 53.4 | 0.886 |

EXAMPLES 3 TO 5

The deinking agents were prepared by the same procedure used in Example 1 except that ingredients listed in Table 3 were used. The printed waste paper was deinked by using each deinking agent in a method mentioned hereinafter and then the results were evaluated in the same way as Example 1. The result of the test is shown in Table 4.

A test of deinking ability

Printed waste paper as a starting material (offset-printed waste paper/typographically-printed waste paper/leaflet=4/3/3 (weight ratio)) was cut into pieces of 3×3 cm, charged into a pulp disintegrator. There were added, on the basis of the weight of the waste paper, 1.0 % of sodium hydroxide, 3.5 % of sodium silicate (No.3), 1.0 % (effective amount) of hydrogen peroxide and 0.35 % of the deinking agent listed in Table 3 to the disintegrator followed by addition of hot water in an amount sufficient to adjust the concentration of the pulp to 15% and disintegration at 55° C. for 15 minutes. The resulting pulp slurry was soaked at 65° C. for 60 minutes, added hot water thereto in an amount sufficient to adjust the concentration of the pulp slurry to 5% followed by disintegration for 1 minute. After the disintegration, the pulp slurry was diluted to 1% with hot water followed by flotation of the pulp slurry at 30° C. for 7 minutes. After the flotation, the pulp slurry was concentrated to 10% and then diluted to 1% with water followed by preparation of the pulp sheet from the pulp slurry using a TAPPI sheet machine.

COMPARATIVE EXAMPLE 5

The deinking agent was prepared by mixing an adduct reactant of nonylphenyl and 9 moles of EO with tallow trimethyl ammonium chloride in a ratio of 0.35 to 0.10 (%). The printed waste paper was deinked by using the resulting deinking agent in the same method as Example 3 and then the test of the deinking ability was determined by the same way as Example 1. The result of the test is shown in Table 4.

COMPARATIVE EXAMPLE 6

α-olefin sulfonate was used as a deinking agent. The printed waste paper was deinked by using the α-olefin sulfonate in the same method as Example 3 and then the test of the deinking ability was determined by the same way as Example 1. The result of the test is shown in Table 4.

COMPARATIVE EXAMPLE 7

A reactant product of 1.0 mole of triethanol amine and 2 moles of methyl ester palm oil fatty acid was subjected to an addition reaction with 70 moles of EO followed by quaterizing the resulting product with 1.0 mole of dimethyl sulfate to obtain the deinking agent. The printed waste paper was deinked by using the resulting deinking agent in the same method as Example 3 and then the test of the deinking ability was determined the same way as Example 1. The result of the test is shown in Table 4.

COMPARATIVE EXAMPLE 8

A reactant product of 1.0 mole of trierhanol amine and 2 moles of tallow fatty acid was subjected to addition reaction with a mixture of 20 moles of EO and 50 moles of PO to obtain the deinking agent. The printed waste paper was deinked by using the resulting deinking agent in the same method as Example 3 and then the test of the deinking ability was determined by the same way as Example 1. The result of the test is shown in Table 4.

COMPARATIVE EXAMPLE 9

A reactant product of 1.0 mole of triethanol amine and 2 moles of coconut oil fatty acid was subjected to addition reaction with a mixture of 25 moles of EO and 5 moles of PO. The resulting product was quaterized to obtain the deinking agent by reacting with 1.0 mole of dimethyl sulfate. The printed waste paper was deinked by using the resulting deinking agent in the same method as Example 3 and then the test of the deinking ability was determined by the same way as Example 1. The result of the test is shown in Table 4.

TABLE 3

Composition of the deinking agents

| Example No. | Fatty acid or Fatty acid of alkyl ester | Amine | Mole ratio *1) | Alkylene Oxide mole *2) | Quaterizing agent mole ratio *3) |
|---|---|---|---|---|---|
| 3 | Coconut oil fatty acid | Mono-ethanol amine | 1.5/1.0 | EO/PO 70/30 (random) | Benzyl chloride 0.6/1.0 |
| 4 | Stearic acid | Tri-ethanol amine | 2.0/1.0 | EO/PO 30/10 (block) | Dimethyl sulfate 0.2/1.0 |
| 5 | Hardened tallow fatty acid | Tri-ethanol-amine | 2.0/1.0 | EO/PO 50/25 (block) | Dimethyl sulfate 0.4/1.0 |

*1) A reaction ratio of the fatty acid and the amine
*2) EO is ethylene oxide, PO is propylene oxide and BO is butylene oxide.
*3) A reaction ratio of the quaterizing agent and the amine

TABLE 4

| | The result of the test | |
|---|---|---|
| | Whiteness(%) | Remaining ink (number/1 field) |
| Example | | |
| No. 3 | 57.2 | 0.131 |
| No. 4 | 57.9 | 0.108 |
| No. 5 | 58.3 | 0.092 |
| Comparative example | | |
| No. 5 | 51.6 | 0.973 |
| No. 6 | 51.8 | 0.970 |
| No. 7 | 52.6 | 0.924 |
| No. 8 | 53.5 | 0.807 |
| No. 9 | 51.9 | 0.951 |

What is claimed is:

1. A deinking agent for reclaiming waste paper comprising a mixture obtained by treating, with a quaternizing agent, a product prepared by addition of alkylene oxide to a reaction product of an amine having at least two active hydrogen atoms in its molecule with a fatty acid and/or a fatty acid alkyl ester, an amount of the quaternizing agent being 0.1 to 0.9 mole of per mole of the amine.

2. The deinking agent of claim i wherein the fatty acid is a saturated or unsaturated straight-chain fatty acid having from 12 to 18 of carbon atoms.

3. The deinking agent of claim 1 wherein the amine is a mono-, di- or tri-alkanol amine having from 2 to 12 of carbon atoms.

4. The deinking agent of claim 1 wherein the amine is monoethanol amine, di-ethanol amine or tri-ethanol amine.

5. The deinking agent of claim 1 wherein the amine is tri-ethanol amine.

6. The deinking agent of claim 1 wherein the quaternizing agent is an alkylhalide having from 1 to 18 of carbon atoms, arylhalide or alkylsulfate having from 1 to 18 of carbon atoms.

7. The deinking agent of claim 1 wherein the quaternizing agent is methyl chloride, benzyl chloride, dimethyl chloride or diethyl sulfate.

8. The deinking agent of claim 1 wherein a reacting molar ratio of the fatty acid and/or fatty acid alkyl ester to the amine is 1.0/1 to 3.0/1.

9. The deinking agent of claim 1 wherein a reacting molar ratio of the fatty acid and/or fatty acid alkylester to the amine is 1.5/1 to 2.5/1.

10. The deinking agent of claim 1 wherein 40 to 100 moles of alkylene oxides are reacted to the reaction product.

11. The deinking agent of claim 10 wherein an amount of the alkylene oxide is 40 to 75 moles.

12. The deinking agent of claim 1 wherein a reacting molar ratio of the quaterizing agent to the amine is 0.2/1 to 0.6/1.

13. A deinking agent comprising a compound of the following formula (I);

$$N(R^1)(R^2)R^3 \ldots \quad (I)$$

wherein $R^1$ is $-C(O)R^4$ or $-(C_2H_4O)C(O)R^4$; $R^2$ is $-(C_2H_4)-(AO)_m$ or $-(AO)_m$; $R^3$ is $-C(O)R^4$ or $-(C_2H_4O)C(O)R^4$; $R^4$ is $C_{9-23}$ alkyl or $C_{9-23}$ alkenyl; m is an integer from 40 to 100 and A is $C_{2-4}$ alkylene, and a quaternary ammonium compound thereof in a molar ratio of 9/1 to 1/9, whenever the compound of formula I possesses $C_{1-18}$ alkyl groups all the position of coordinate bond on the nitrogen atom.

14. The deinking agent of claim 13 wherein $R^1$ is $-(C_2H_4O)C(O)R^4$; $R^2$ is $-(C_2H_4)-(AO)_m H$ and $R^3$ is $-(C_2H_4O)C(O)R^4$.

15. The deinking agent of claim 13 wherein $R^4$ is $C_{11-17}$ alkyl or $C_{11-17}$ alkenyl.

16. The deinking agent of claim 13 wherein not less than 50 % of AO among $(AO)_m$ contained in $R^2$ is ethyleneoxide.

17. The deinking agent of claim 13 wherein the quaternary ammonium compound has a $C_{1-18}$ alkyl group or an aryl group.

18. The deinking agent of claim 13 wherein the quaternary ammonium compound has methyl, ethyl or benzyl.

19. The deinking agent of claim 13 wherein m is from 40 to 75.

20. The deinking agent of claim 13 wherein the molar ratio of the compound of formula (I) and the quaternary ammonium compound thereof is 4/1 to 2/3.

* * * * *

UNITED STATES PATENT AND TRADEMARK OFFICE
CERTIFICATE OF CORRECTION

PATENT NO. : 5,346,543
DATED : September 13, 1994
INVENTOR(S) : Yoshie Hirakouchi et al.

It is certified that error appears in the above-indentified patent and that said Letters Patent is hereby corrected as shown below:

<u>On the Title Page</u>

In the third line of the "Abstract" delete "$N(R^1)(R^1)R^2$" and substitute --$N(R^1)(R^2)R^3$--.

Col. 7, In claim 2, line 60 delete "claim i" and substitute --claim 1--.

Col. 8, In claim 13, line 40 delete "whenever" and substitute --wherein--.

Col. 8, In claim 13, line 41 delete "all" and substitute --or aryl groups at--.

Signed and Sealed this

Seventeenth Day of October, 1995

Attest:

BRUCE LEHMAN

Attesting Officer

Commissioner of Patents and Trademarks